Patented Apr. 25, 1944

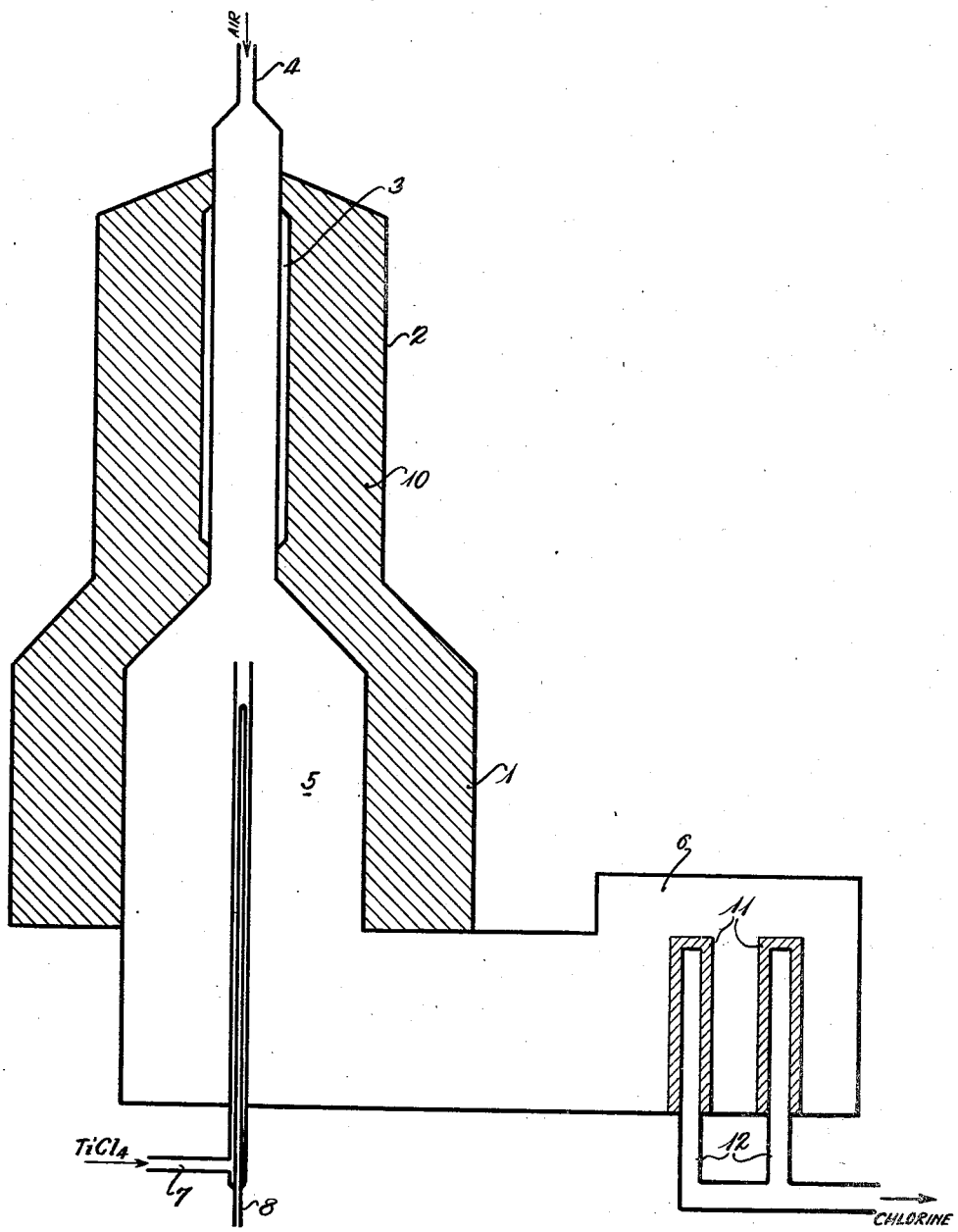

2,347,496

UNITED STATES PATENT OFFICE 2,347,496

PREPARATION OF PIGMENTS

Irving E. Muskat and Alphonse Pechukas, Akron, Ohio, assignor to Pittsburgh Plate Glass Company, Pittsburgh, Pa., a corporation of Pennsylvania Application August 4, 1941, Serial No. 405,418

9 Claims. (Cl. 106—300)

This invention relates to the production of finely divided metallic oxides from the corresponding halides and is particularly directed to the production of metallic oxides having pigmentary properties. In our prior application Serial No. 271,694 filed May 4, 1939, of which this application is a continuation-in-part, methods have been described wherein titanium halides, such as titanium tetrachloride, are reacted with oxygen at a high temperature to produce a finely divided pigmentary titanium dioxide which is substantially free from crystalline titanium dioxide. In such application and also in an application of Irving E. Muskat Serial No. 176,647 filed November 26, 1937, it was pointed out that considerable difficulty is encountered in the production of titanium dioxide by decomposition of titanium halides with oxygen-containing gases, due to the fact that an objectionable quantity of crystalline titanium dioxide having few if any pigmentary characteristics is produced. In accordance with the methods described in such applications it was found that the formation of this crystalline product was due largely to the fact that the titanium halide was decomposed adjacent hot surfaces within the reaction chamber. It was further noted that formation of crystals could be substantially minimized by conducting the reaction out of contact with such hot surfaces and accordingly methods were described whereby this result might be effected.

In accordance with the present invention it has been noted that similar difficulties are encountered in the treatment of other metallic halides which are capable of reacting with oxygen or oxygen-containing gases to form the corresponding metallic oxides. Thus, when the halides of aluminum, zinc, antimony, zirconium, chromium (including chromic, chromous and chromyl chlorides), cobalt, silicon, berylium, boron, cadmium, molybdenum, nickel, vanadium, etc., as well as titanium, are converted to the oxides, coarse crystalline materials are frequently produced. However, by conducting the reaction in vapor phase out of contact with the hot furnace walls or other hot surfaces, a uniform, finely divided oxide may be obtained.

The invention is applicable to the decomposition of pure halides or it may be applied to treatment of mixtures of halides to form extended or blended pigments, particularly blended or extended titanium dioxide pigments. For example, white pigments may be prepared by thermally decomposing a mixture of titanium tetrachloride and a metallic halide such as zinc chloride, aluminum chloride, or silicon tetrachloride with oxygen containing gases. Similarly, a tinted pigment may be secured by decomposition of a titanium halide in the presence of a chloride of a metal capable of forming a colored oxide such as chromic chloride, chromyl chloride, cobalt chloride, vanadium chloride, etc. Likewise, the chlorides of other metals such as lead, bismuth, or antimony may be decomposed under similar conditions. The incorporation of these agents serves not only to improve or change the color of the titanium dioxide but also acts to produce products of more uniform chalking characteristics, oil absorption, particle size, and to improve various other characteristics of the pigment. In any event, the process should be conducted in a manner such that the thermal decomposition occurs in vapor phase and out of contact with hot surfaces within the reaction chamber in order to minimize the formation of seed crystals which promote the formation of the macro-crystalline form of oxide.

In order to inhibit the formation of crystals at the point of introduction of the metallic halide, we have found it desirable to establish and maintain an atmosphere of a suitable gaseous halogen such as chlorine or other halogen adjacent or the point of introduction of the metallic halide into the reaction chamber whereby the incoming metallic halide is introduced into the reaction chamber through this gaseous medium and the inlet itself is maintained out of substantial contact with the oxidizing atmosphere within the reaction chamber proper. The presence of such a gas not only minimizes the possibility for accumulation of oxygen adjacent the inlet for the metallic halide but also tends to rechlorinate any metallic oxide which may have been inadvertently formed at this point. Thus, the tendency for growth of buds or crystals upon the nozzle is minimized. Moreover, it is found that by use of halogen such as chlorine adjacent this nozzle the undesirable dilution which would normally occur when inert gases are utilized as a protective envelope is eliminated and thus more concentrated chlorine is obtained upon removal of the evolved gases from the reaction chamber.

Various methods of introducing the chlorine or other halogen into the reaction chamber may be used. Ordinarily the metallic halide is introduced into the chamber in a vaporized state through a nozzle or tube. If desired this nozzle or tube may be placed concentrically within a second larger tube or nozzle through which the chlorine or other halogen may be permitted to flow. In such a case a stream of chlorine may flow continuously or intermittently past the metallic chloride inlet thus sweeping the metallic chloride away from the inlet and into a reaction zone where it is decomposed. In accordance with a further modification, the metallic halide may be introduced by establishing a chlorine atmosphere in a portion of the furnace or reactor and the metallic halide sprayed or showered through this atmosphere into an oxidizing zone within the furnace.

In accordance with a preferred modification of this invention, it is found desirable to make use of chlorine or halogen which is evolved during the decomposition of the metallic chloride or other halide. This may be done for example by conducting the decomposition in a manner such that the chlorine evolved during the reaction is swept back over the surface of the metallic halide inlet. For example, we have been able to provide a suitable device wherein air or oxygen and titanium tetrachloride or similar metallic halide are introduced into a reaction zone in opposed directions and at least a portion of the chlorine which is produced is withdrawn along the exterior of the tetrachloride inlet. By this means it will be seen that the evolved chlorine forms a fluid envelope adjacent the metallic chloride inlet and thus substantially minimizes oxidation at this point. This phase of the invention may be fully understood by reference to the accompanying drawing which is a diagrammatic sectional view of an apparatus which may be used in accordance with this invention.

In this embodiment we may use a vertical cylindrical furnace 1, which may be provided with a reaction chamber 5, and a preheating chamber 2. The preheating chamber is provided with suitable heating elements 3, and if desired, the reaction chamber may also be heated in this manner with elements not shown. The furnace may be covered with suitable insulation 10, and is constructed to communicate with a filtration chamber 6, in which titanium dioxide or other metal oxide may be removed from the reaction gases by passage through suitable porous filter candles 11 made of a suitably resistant material such as aluminum oxide. The gases are then withdrawn through outlet 12 and the chlorine therein collected therefrom if desired. The furnace is also provided with titanium tetrachloride inlet 7, which may be heated by heating element 8.

In the operation of the device, air, oxygen or other oxygen-containing gas is introduced into the furnace at 4, and is preheated in preheater 2, by means of heating element 3. At the same time titanium tetrachloride or another metallic chloride or mixture of chloride is introduced into tube 7, with or without a suitable diluent such as nitrogen, chlorine or carbon dioxide, and is heated by element 8, as it passes into the furnace. The chloride is decomposed in the reaction chamber to form the corresponding metal oxide and chlorine when it contacts the hot stream of oxygen. Chlorine and suspended oxide are then withdrawn along the exposed portions of inlet tube 7 and introduced into filter chamber 6. After removal of the suspended oxide, chlorine is withdrawn at outlet 12. The flow rates of oxygen and metallic chloride are adjusted so that substantially all of the oxygen is used up in the reaction and no substantial quantity of gaseous oxygen remains in the chlorine gas which is withdrawn along the exterior of the titanium tetrachloride inlet. Ordinarily the process is regulated to introduce oxygen and metallic chloride in stoichiometric amounts required for production of titanium dioxide. However, small excesses of the order of 5 to 10 percent of either material are found to be unobjectionable.

If desired, the process may be conducted using a substantial excess of metallic chloride. In such case the atmosphere about the inlet may contain metallic chloride vapor. This vapor does not thermally decompose at that point to an appreciable degree however due to the fact that oxygen is not present in appreciable concentrations.

It will be apparent that by proper regulation of the size of the chamber and of the rates of introduction of oxygen and metallic chloride and of withdrawal of evolved chlorine it is possible to conduct the process in a manner such that oxygen and metallic chloride do not accumulate in reacting concentrations adjacent the hot walls of the chamber. Consequently, decomposition of the tetrachloride adjacent the hot surfaces with undesirable crystal formation may be avoided. Moreover, the prevention of the crystal formation may be facilitated by introducing the titanium tetrachloride at high speeds whereby it is removed from the inlet before decomposition can occur.

While crystal formation adjacent the walls of the decomposition chamber may be prevented or minimized by establishment of a protective film of inert gas, or chlorine, in a manner similar to that resorted to in the protection of the metallic chloride inlet, this is generally found to be unnecessary since it is found that if a reactor of sufficient size is utilized decomposition of the metallic chloride adjacent the hot surfaces of the walls may be avoided to a substantial degree. The actual size of the reaction zone will of course vary with the size of the oxygen and metallic halide inlets and with the rate of introduction of the reactants. Accordingly, no specific dimensions may be set forth. Generally speaking, however, if crystals are formed to any substantial degree the reaction zone should be enlarged.

The temperature of operation may be varied to a considerable degree in accordance with the halide undergoing decomposition as will be understood by those skilled in the art. Generally, it is found preferable to conduct the process at a temperature of above 1400° F. when a titanium pigment is to be produced and the temperature is usually maintained at 1400 to 2200° F. Lower temperatures may be utilized, but generally tend to result in the production of lower yields of such pigments. With other halides similar temperatures may be utilized although the permissible temperatures differ considerably with each halide. Some halides decompose at low temperatures, for example 100 to 300° C. while others may require temperatures as high as 1500° C.

The product obtained by this process is found to be in an extremely finely divided form, generally having a particle size well below one micron. Thus, titanium dioxide-chromium oxide pigments or other oxide pigments having a particle size of approximately 0.3 to 0.5 micron and which are substantially free from crystalline oxide are secured without difficulty.

As previously noted, the invention is applicable to the decomposition of a pure metallic halide in order to form a substantially pure pigmentary metallic oxide, or the invention may be applied to the production of mixed or blended pigments; for example, in the decomposition of a mixture of metallic halides.

The proportions of the metallic halide when mixtures are decomposed are capable of wide variation in accordance with the results desired. Often, it is found desirable to treat mixtures of titanium tetrachloride with other metallic halides in order to form blended titanium dioxide pigments. In many such cases only small quantities of other halide, for example, 0.001 to one percent by weight based upon the weight of titanium halide is found necessary. Thus, it is found that such small amounts of compounds such as cobalt chloride, molybdenum chloride, silicon tetrachloride, aluminum chloride, zinc chloride, zirconium chloride, etc. may materially improve the characteristics (whiteness, chalk resistance, etc.) of titanium dioxide. In other cases, the production of colored pigments is desirable and accordingly, the amount of other metal oxide incorporated will depend upon the color desired. Thus, increased quantities of pigmentary products or halides capable of forming oxides such as chromium, nickel, copper, vanadium, molybdenum chloride, or other chloride, may be added in somewhat larger quantities to produce a tinted or an extended pigment. In such a case it is desirable to use sufficient titanium tetrachloride to insure the presence of at least about 25 percent titanium dioxide in the final pigment. Mixtures of titanium chloride with titanium bromides, fluorides, and iodides may be used as well as halides of other metals. The mixtures of halides may be formed by passing heated vaporized titanium tetrachloride over the other halide at a temperature sufficiently high to vaporize said other halide or the halides may be separately vaporized and mixed. It will likewise be apparent that mixtures of other metallic halides such as a mixture of iron chloride and chromic chloride, zinc chloride and chromic chloride, etc., may be decomposed in similar manner.

The decomposition of the halides may be conducted in the presence of added metallic salts other than halides. Thus, cobalt, antimony, chromium, nickel, copper, aluminum, etc., may be added as sulphides, sulphates, or other salts. Similarly, the added agent may be introduced as an oxide or in the free metallic state. The decomposition is conducted at temperatures at which the added agent is in vapor state. When a metal or a metallic oxide, sulphide or other non-halide agent is introduced into the reaction zone it may be first halogenated by the free halogen before it contacts the oxygen. In this case it will be converted to the oxide subsequently.

The following examples are illustrative:

*Example I*

Using an apparatus having the general structure as shown in the accompanying drawing, air was introduced into a reaction zone having an internal diameter of 14 inches at the rate of 180 liters per minute and titanium tetrachloride counter-currently introduced through a tube having an internal diameter of 5/8 inch at a rate of 33.6 liters per minute. The temperature was maintained at 1800° F. through the reaction, and the reaction gases containing chlorine were withdrawn along the exterior of the titanium tetrachloride inlet tube and conducted to the settling chamber where suspended titanium dioxide was recovered. The process was continuously operated for a period of 5¼ hours and a yield of 96 percent of pigmentary titanium dioxide was obtained. The amount of crystals formed was negligible.

*Example II*

The process described in Example I was repeated using a reaction chamber having an internal diameter of 4 in. through which air was introduced at a rate of 28 liters per minute. The titanium tetrachloride was introduced through a tube having a diameter of 0.5 inch at a rate of 30 grams per minute. The temperature was maintained at 1800° F. through the duration of the reaction. The product was very fine and possessed a good color. The amount of coarse crystals formed was below 0.5 percent of the total $TiO^2$ formed.

*Example III*

Utilizing an apparatus as described in Example I, pigmentary zinc oxide was produced by introducing a vaporized stream of zinc chloride into the reaction chamber at a rate of 20 liters per minute and air at a rate of 60 liters per minute, the temperature being maintained at 900° C. during the entire time the process was maintained in operation. A finely divided zinc oxide was thereby secured.

*Example IV*

The process described in Example I was repeated using chromic chloride in lieu of titanium tetrachloride. The chromic chloride was introduced at a rate of 32 grams per minute and air was introduced at a rate of 20 liters per minute, the temperature within the reaction chamber being maintained at 1000° C. throughout the reaction. A finely divided chromic oxide was produced. To enhance the volatility of the chromic chloride, 5 liters of chlorine per minute were passed through the chromic chloride vaporizer and thus, the gas mixture entering the decomposition chamber contained 1 mol of chlorine per mol of chromium halide.

*Example V*

The process described in Example I was repeated using vaporized zirconium tetrachloride which was introduced at a rate of 20 liters per minute and air was introduced at a rate of 110 liters per minute, the temperature within the reaction being maintained about 1000° C. throughout the reaction.

*Example VI*

The process of Example I was repeated by introducing a vaporized mixture comprising 98 percent by volume of titanium tetrachloride and 2 percent by volume of silicon tetrachloride, a white product of very fine particle size being secured.

*Example VII*

The process of Example I was repeated by introducing aluminum chloride vapor at a temperature of about 300° C. into a reaction chamber at a rate of about 27 gm. per minute and air at a rate of about 23 liters per minute, the temperature within the reaction zone being maintained at 900–950° C. The aluminum oxide was collected in the settling chamber and was calcined for one hour at 500° C. in the presence of oxygen to remove traces of chlorine.

Although the present invention has been de-

We claim:

1. An improvement in the process of preparing a metallic oxide by thermal reaction of oxygen with a metallic halide capable of reacting with oxygen while minimizing reaction of the halide adjacent hot surfaces which comprises the step of introducing the halide into an oxygen containing atmosphere through an atmosphere of a gaseous halogen which is substantially free from a reacting concentration of oxygen.

2. A method of producing a "finely divided" metallic oxide which comprises reacting oxygen with a vaporized metallic halide capable of reacting with oxygen in gas suspension at a temperature sufficiently high to cause such reaction, localizing the reaction of oxygen and halide within a zone out of contact with hot surfaces, and introducing the halide into the reaction zone through an atmosphere of a gaseous halogen which is substantially free from a reacting concentration of oxygen.

3. A method of producing a finely divided metallic oxide which comprises reacting oxygen with a vaporized metallic oxide capable of reacting with oxygen in gas suspension at a temperature sufficiently high to cause such reaction, localizing the reaction of oxygen and halide within a zone out of contact with hot surfaces, and introducing the halide into the reaction zone through an atmosphere of gaseous chlorine which is substantially free from a reacting concentration of oxygen.

4. A method of preparing a metallic oxide which comprises separately introducing oxygen and a metallic halide capable of reacting with oxygen in substantially opposite directions into a reaction chamber, reacting the oxygen with the metllic halide at a temperature sufficiently high to cause such reaction within a zone which is out of contact with hot surfaces to form a metallic oxide and halogen, and moving a portion of the evolved halogen which is substantially free from a reacting concentration of oxygen to a point adjacent the inlet for the metallic halide whereby an atmosphere of halogen is formed about the inlet.

5. In the process of producing a titanium dioxide containing pigment by reaction of oxygen with titanium tetrachloride and a chloride of another metal capable of reacting with oxygen in gas suspension at a temperature sufficiently high to cause such reaction, the step which comprises introducing said chlorides into a reaction zone which is localized out of contact with hot surfaces through an atmosphere of gaseous chlorine which is substantially free from a reacting concentration of oxygen.

6. In a process of producing a finely divided chromium oxide by reaction of oxygen with chromium chloride in gas suspension at a temperature sufficiently high to cause such reaction, the steps which comprise introducing separately oxygen and a chromium chloride into a reaction zone which is localized out of contact with hot surfaces and maintaining an atmosphere of gaseous chlorine which is substantially free from a reacting concentration of oxygen adjacent the point of entry of the chromium chloride.

7. A method of preparing a chromium oxide which comprises separately introducing oxygen and a chromium chloride in substantially opposite directions into a reaction chamber, reacting the oxygen with the chromium chloride at a temperature sufficiently high to cause such reaction within a zone which is out of contact with hot surfaces to form a chromium oxide and chlorine, and moving a portion of the evolved chlorine which is substantially free from a reacting concentration of oxygen to a point adjacent the inlet for the chromium chloride whereby an atmosphere of chlorine is formed about the inlet.

8. A method of producing a finely divided pigment which comprises reacting oxygen with a mixture of vaporized metallic halides capable of reacting with oxygen in gas suspension at a temperature sufficiently high to cause such reaction, localizing the reaction of oxygen and halides within a zone out of contact with hot surfaces, and introducing the halides into the reaction zone through an atmosphere of a gaseous halogen which is substantially free from a reacting concentration of oxygen.

9. A method of preparing a pigment which comprises introducing oxygen and a mixture of titanium tetrachloride and a chromium chloride in substantially opposite directions into a reaction chamber, reacting the oxygen with the chloride mixture at a temperature sufficiently high to cause such reaction within a zone which is out of contact with hot surfaces to form a mixture of titanium and chromium oxides and chlorine, and moving a portion of the evolved chlorine which is substantially free from a reacting concentration of oxygen to a point adjacent the inlet for the mixed chlorides whereby an atmosphere of chlorine is formed about the inlet.

IRVING E. MUSKAT.
ALPHONSE PECHUKAS.